United States Patent
Wang et al.

(10) Patent No.: US 10,752,215 B2
(45) Date of Patent: Aug. 25, 2020

(54) VEHICLE AUTOMATIC DEFROST SYSTEM AND CONTROL METHOD FOR EXTERNAL WINDOW SURFACE

(71) Applicant: FORD GLOBAL TECHNOLOGIES, LLC, Dearborn, MI (US)

(72) Inventors: Kai Wang, Houston, TX (US); Christopher Mark Greiner, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 70 days.

(21) Appl. No.: 15/986,905

(22) Filed: May 23, 2018

(65) Prior Publication Data

US 2019/0359175 A1 Nov. 28, 2019

(51) Int. Cl.
*B60S 1/02* (2006.01)
*B60H 1/00* (2006.01)
*B60S 1/08* (2006.01)

(52) U.S. Cl.
CPC .......... *B60S 1/023* (2013.01); *B60H 1/00785* (2013.01); *B60H 1/00964* (2013.01); *B60S 1/0818* (2013.01); *B60S 1/0866* (2013.01)

(58) Field of Classification Search
CPC .... B60S 1/023; B60S 1/0866; B60S 1/00785; B60S 1/0818; B60J 1/002
USPC ......................................................... 165/230
See application file for complete search history.

(56) References Cited

U.S. PATENT DOCUMENTS

| | | | |
|---|---|---|---|
| 5,057,666 A | 10/1991 | Takada | |
| 7,210,523 B2 * | 5/2007 | Umebayashi | B60H 1/00785 165/204 |
| 7,296,621 B2 * | 11/2007 | Yonekura | B60H 1/0075 165/202 |
| 7,345,445 B2 | 3/2008 | Huntzicker | |
| 7,392,838 B2 * | 7/2008 | Errington | B60H 1/00785 165/202 |
| 7,783,400 B1 | 8/2010 | Zimler | |
| 7,866,169 B2 | 1/2011 | Errington et al. | |
| 8,301,335 B2 * | 10/2012 | Hill | G05B 13/021 701/36 |

(Continued)

FOREIGN PATENT DOCUMENTS

FR 2789034 A1 8/2000

OTHER PUBLICATIONS

English Machine Translation of FR2789034A1.
(Continued)

*Primary Examiner* — Nelson J Nieves
(74) *Attorney, Agent, or Firm* — David Coppiellie; King & Schickli, PLLC

(57) ABSTRACT

A system for automatically controlling a defog/defrost function of a vehicle climate control system includes a controller configured to calculate an ambient dew point temperature value from a plurality of inputs received from a sensor array. The controller is further configured to set a condensation indicator if a calculated difference between a window exterior surface temperature value input received from the sensor array and the calculated ambient dew point temperature value is less than or equal to a predetermined threshold value. The controller actuates the vehicle climate control system defog/defrost function and/or a window wiper system in response to the set condensation indicator.

13 Claims, 4 Drawing Sheets

(56) References Cited

U.S. PATENT DOCUMENTS

| | | | |
|---|---|---|---|
| 8,701,427 B2* | 4/2014 | Yelles | B60S 1/0896 |
| | | | 165/230 |
| 8,745,998 B2* | 6/2014 | Delorme | B60S 1/026 |
| | | | 165/230 |
| 2004/0182094 A1* | 9/2004 | Menager | B60H 1/00785 |
| | | | 62/176.5 |
| 2005/0073396 A1* | 4/2005 | Mills | B60Q 9/008 |
| | | | 340/435 |
| 2006/0289458 A1* | 12/2006 | Kim | B60H 1/00785 |
| | | | 219/497 |
| 2008/0121034 A1* | 5/2008 | Lynam | B60H 1/00785 |
| | | | 73/335.05 |
| 2009/0039170 A1* | 2/2009 | Burns | B60H 1/00785 |
| | | | 236/44 A |
| 2010/0163220 A1* | 7/2010 | Nakajima | B60H 1/00785 |
| | | | 165/202 |
| 2011/0238263 A1* | 9/2011 | Fuse | B60H 1/00771 |
| | | | 701/36 |
| 2013/0112390 A1* | 5/2013 | Arai | B60H 1/00771 |
| | | | 165/202 |
| 2013/0291577 A1* | 11/2013 | Miyakoshi | B60H 1/00392 |
| | | | 62/151 |
| 2015/0017900 A1* | 1/2015 | Baek | B60H 1/00742 |
| | | | 454/75 |
| 2015/0266357 A1* | 9/2015 | Bidner | B60H 1/00785 |
| | | | 165/288 |
| 2016/0176528 A1* | 6/2016 | Meis | B60H 1/00785 |
| | | | 701/36 |
| 2016/0244025 A1* | 8/2016 | Melas | B60S 1/023 |
| 2016/0361973 A1* | 12/2016 | Mayer | B60H 1/00764 |
| 2017/0096048 A1* | 4/2017 | Larson | B60H 1/3207 |
| 2017/0106721 A1* | 4/2017 | Hoke | B60H 1/00785 |
| 2017/0166037 A1* | 6/2017 | Lee | B60H 1/00864 |
| 2017/0246930 A1 | 8/2017 | Ochiai et al. | |
| 2018/0272946 A1* | 9/2018 | Worthen | B60R 1/06 |
| 2019/0084381 A1* | 3/2019 | Daniel | B60H 1/00785 |

OTHER PUBLICATIONS www.ccruze.com, Chevrolet Cruze Owners Manual: Climate Control Systems, http:/www.ccruze.com/climate_control_systems-219.html, Dec. 1, 2017, pp. 1-9.

www.hsfmannual.com, Hyundai Santa Fr: Auto defogging system, hhtp:/www.hsfmanual.com/auto_defogging_system-1231.html, Dec. 1, 2017, pp. 1-3.

* cited by examiner

VEHICLE AUTOMATIC DEFROST SYSTEM AND CONTROL METHOD FOR EXTERNAL WINDOW SURFACE

TECHNICAL FIELD

This document relates generally to the motor vehicle field and, more particularly, to systems and methods for automatic defrosting/defogging of vehicle external window surfaces.

BACKGROUND

Most modern vehicles, including electric, hybrid, combustion engine-based, and autonomous vehicles, include some version of a climate control system that provides a desired level of climatic control for a passenger cabin of the vehicle. This is typically provided by the vehicle heating, air-conditioning, and ventilation (HVAC) system which, via a network of ducts and air registers, directs an airflow into the passenger cabin. The airflow is cleaned, filtered, heated, cooled, humidified/dehumidified, recirculated or blended with fresh air from an exterior of the vehicle, etc. according to vehicle user preference. By the climate control system, a desired level of perceived user comfort can be established.

The climate control system is typically controlled via a climate control head, being a control panel including various manual actuators. The climate control head can be provided in a variety of designs and include a variety of controls or actuators. One control typically included is for a defrost/defog setting by which build-up of condensation or frost on exterior and/or interior surfaces of a vehicle window can be prevented.

Conventionally, the defrost function of the climate control system is controlled manually via the climate control head. To implement the defrost function, the user is typically required to identify actual or potential condensation or frost on a surface of the window, to determine the proper settings for the climate control system to quickly remove the condensation or frost, and to manually implement those settings. This may be done in conjunction with operation of the vehicle wiper system (for windows so equipped) to more quickly remove condensation and/or frost.

The optimal settings for a defrost function of a climate control system are a function of a number of variables. These include dry bulb ambient air temperature, dew point temperature (i.e. the temperature at which condensation is likely to form on a window surface), ambient relative humidity, and window surface temperature. Many if not all of these variables cannot readily be discerned or calculated by a user, and so typically defrost airflow temperature and relative humidity are set to a default level. Likewise, defrost airflow speed (i.e. HVAC blower speed) is either set to a default speed or set manually by a user according to perceived speed of clearing of condensation/frost.

However, if the defrost function of the climate control system is not set to optimal settings, clearing of condensation and/or frost may be delayed, and a user may attempt to operate the vehicle before such clearing is completed. This results in a potentially unsafe situation. In another potential situation, for autonomous vehicles (i.e. vehicles configured to sense their environment and navigate between geographical locations with little to no human input) a user may not be available to select desired defrost function settings.

To address these and other problems, the present disclosure describes systems and methods for automated control of a vehicle window defroster function of a climate control system. The systems and methods rely on a variety of inputs to determine and actuate optimal settings for the defrost function, all without requiring human input.

SUMMARY

In accordance with the purposes and benefits described herein, systems for automatic control of a defog/defrost function of a vehicle climate control system are described, comprising a controller configured to calculate an ambient dew point temperature value from a plurality of inputs received from a sensor array and to set a condensation indicator if a calculated difference between a window exterior surface temperature value input received from the sensor array and the calculated ambient dew point temperature value is less than or equal to a predetermined threshold value. The controller actuates actuate the vehicle climate control system defog/defrost function and/or a window wiper system in response to the set condensation indicator. The controller may be comprised in a climate control module. Vehicles including the claimed systems are also described.

In embodiments the controller is further configured to calculate a difference between the window exterior temperature value input and the calculated ambient dew point temperature value input to provide a calculated difference value. The controller then compares the calculated difference value to a predetermined threshold difference value and sets the condensation indicator according to that comparison.

In embodiments, the sensor array comprises at least one or more ambient temperature sensors, one or more ambient relative humidity sensors, one or more window exterior surface temperature sensors, one or more passenger cabin temperature sensors and one or more passenger cabin humidity sensors.

In an embodiment, the controller is further configured to set a defrost airflow temperature value as a function of a passenger cabin temperature value input and a passenger cabin relative humidity value input. The controller may be further configured to set a speed value of the wiper system as function of a determined probability of formation of condensation on an exterior surface of the window.

In an embodiment, a "pre-conditioning" mode of operation is provided wherein the controller is further configured for operative communication with a remotely located device selected from the group consisting of a smartkey, a keyfob, a smartphone and a portable computing device.

In another aspect, methods for automatically controlling a defog/defrost function of the vehicle climate control system, implemented by the above-described systems, are also provided.

In the following description, there are shown and described several preferred embodiments of the disclosed systems and methods for automated control of a vehicle window defroster function of a climate control system. As it should be realized, the systems and methods are capable of other, different embodiments and their several details are capable of modification in various, obvious aspects all without departing from the descriptions set forth herein and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the system and method for monitoring and evaluating performance of a vehicle window defroster and together with the description serve to explain certain principles thereof. In the drawing figures:

FIG. 1 schematically illustrates a vehicle equipped with a system according to the present disclosure for automatically controlling a climate control system defrost function;

Reference will now be made in detail to the present preferred embodiments of the described systems and methods for automated control of a vehicle window defroster function of a climate control system, examples of which are illustrated in the accompanying drawing figures.

DETAILED DESCRIPTION

At a high level, the present disclosure is directed to methods for automatically controlling a defrost function of a vehicle climate control system to reduce condensation and/or frosting of an external surface of a vehicle window. The disclosure is further directed to systems for implementing the methods. The methods and systems are described primarily in the context of reducing/eliminating condensation and/or frost from an exterior surface of a vehicle front windshield. However, the skilled artisan will readily appreciate that the described methods and systems are equally applicable to any window or other surface of a vehicle having an adjacent air vent and being susceptible to formation of condensation and/or frost, for example the front driver and passenger side windows, the rear driver and passenger side windows, the rear window, etc. The system includes a sensor array providing a variety of inputs to a controller. The controller is in operative communication with the climate control system and is configured to determine a risk of condensation/frost forming on an exterior surface of the window from those inputs. The controller sets a condensation indicator from that determined risk. When the condensation indicator is set, the controller is further configured to control the vehicle climate control system to remove condensation/frost from the window by directing a suitably conditioned airflow against the window and, if needed, by actuating the vehicle wiper system. Still further, the controller is configured to determine an optimal airflow temperature and humidity and also to determine an optimal wiper motor speed to remove the condensation and/or frost in a rapid and efficient manner.

Figure 1:
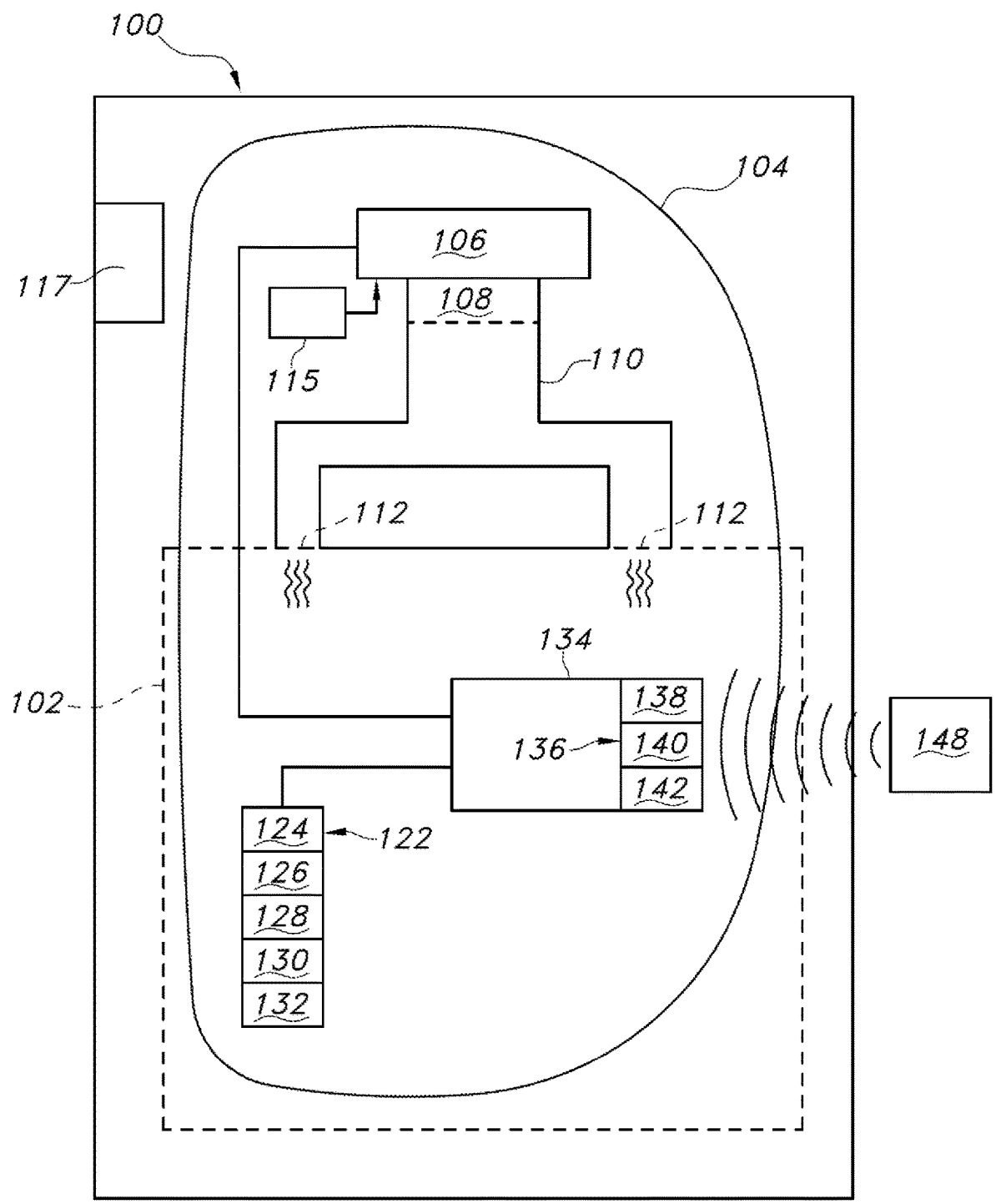
Figure 2:
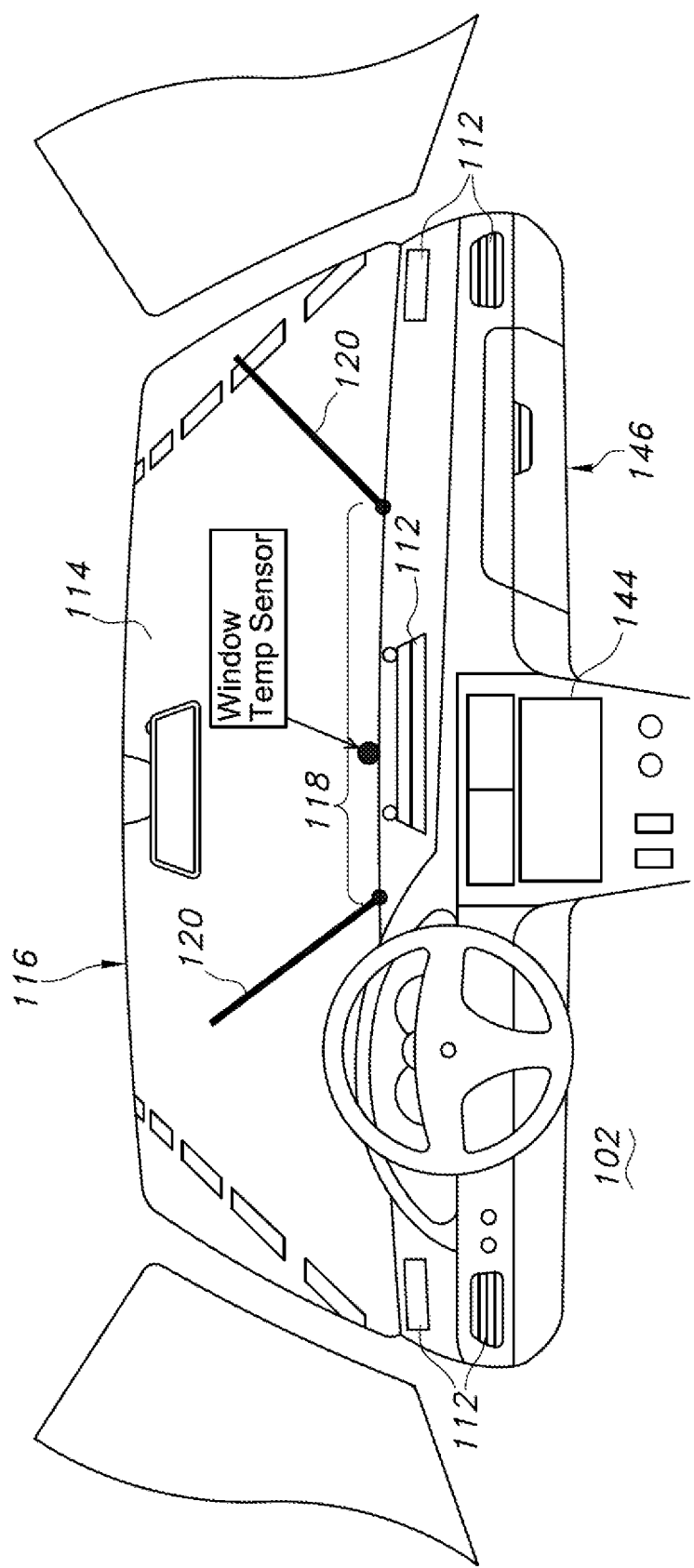
FIG. 2 illustrates a vehicle dash panel and windshield including the system of FIG. 1.

FIG. 1 schematically illustrates a vehicle 100 including a passenger cabin 102 whose environment is kept at a desired comfort level by a climate control system. The basic elements for climate control in a vehicle are well-known to the skilled artisan, and a detailed description thereof is unnecessary to the present disclosure. However, at a high level the vehicle 100 includes a climate control system depicted generally by reference numeral 104, which as is known comprises various elements for providing a conditioned airflow to the passenger cabin 102, including without intending any limitation a compressor, an evaporator core, conduits, and other elements represented generally by reference numeral 106. The climate control system 104 further includes a blower 108 in fluid communication with an air distribution door (not shown) that routes conditioned airflow via a network of ducts 110 to one or more of a plurality of air vents 112. As is known, the air distribution door may be automatically controlled by way of an actuator controlling mechanical linkages (not shown) of various designs. Of particular relevance to the present disclosure are air vents 112 which are disposed to direct an airflow of conditioned air against a passenger cabin 102-facing surface 114 of a vehicle window 116 (see FIG. 2), to reduce the risk of formation of condensation/frost on and/or to clear existing condensation/frost from an exterior surface of the vehicle window 116. The climate control system further includes a recycled air port 115 for returning air from the passenger cabin 102 to the climate control system 104, and one or more fresh air ports 117 for directing fresh airflow from an exterior of the vehicle 100 into the passenger cabin 102.

The skilled artisan is well aware that additional air vents 112 may be provided at various locations of the vehicle 100 to provide for driver and passenger comfort. The skilled artisan is further well aware that the climate control system 104 operates in a variety of functional modes, including without intending any limitation a heating mode, an air-conditioning (cooling) mode, a recirculation mode, a fresh air mode, and a defrost mode. The specific hardware, software, and settings of a climate control system 104 that allow the system to operate in these and other modes, and to provide conditioned airflow at a near-infinite variety of temperature values, relative humidity values, etc. are known to the skilled artisan.

The vehicle 100 is further provided with a wiper system 118 (see FIG. 2) including as is known a motor (not shown) and one or more wiper blades 120, disposed to pass over the exterior surface of the vehicle window 116 to physically remove condensation and frost. The wiper system 118 motor is adapted to move the wiper blades 120 at various speeds, including without intending any limitation in an intermittent mode, at a low continuous speed mode, at a high continuous speed mode, and potentially at incrementally increasing speeds between the low continuous speed mode and the high continuous speed mode.

Returning to FIG. 1, the vehicle 100 is further provided with a sensor array 122. In embodiments, the sensor array 122 includes at least one or more sensors configured to provide an input indicative of a vehicle-exterior ambient temperature, one or more sensors configured to provide an input indicative of a vehicle-exterior relative humidity, one or more sensors configured to provide an input indicative of a passenger cabin 102 temperature, one or more sensors configured to provide an input indicative of a passenger cabin 102 relative humidity, one or more sensors configured to provide an input indicative of a vehicle window 116 exterior surface temperature, and others. Any suitable temperature sensor is contemplated for use herein, including without intending any limitation thermistor-based sensors, negative temperature coefficient sensors, infrared sensors, and others. Likewise, any suitable humidity sensor is contemplated for use herein, including without intending any limitation capacitive humidity sensors, thermal humidity sensors, and resistive humidity sensors.

The sensor array 122 is schematically depicted in FIG. 1 as a unit for convenience in illustration. However, the skilled artisan will appreciate that the specific placement of the various individual sensors of the sensor array 122 will vary according to the specific function of the individual sensors and potentially according to the specific type of sensor employed. For example, the sensor array 122 may include one or more ambient temperature sensors 124 and ambient relative humidity sensors 126, typically disposed on or near an exterior surface of the vehicle 100 to allow measuring the exterior temperature. The sensor array 122 may further include one or more passenger cabin temperature sensors 128 and one or more passenger cabin relative humidity sensors 130, typically disposed in an interior of the passenger cabin 102. One or more window temperature sensors 132 may be physically placed adjacent to an exterior surface of a vehicle window 116 such as the windshield (see FIG. 2) or if based on infrared technology may be disposed to impinge a sensor signal on that exterior surface to take a temperature reading.

The climate control system 104 further includes one or more electronic computer units (ECU) in operative and/or informational communication with various elements of the climate control system. The operative and/or informational communication may be by way of various wired and wireless means, including without intending any limitation a vehicle wired bus relying on various known protocols such as a Controller Area Network (CAN), a Local Interconnect Network (LIN), and others. Wireless communication is also contemplated, including WiFi, Bluetooth®, RFID, and others. In an embodiment, the ECU is a dedicated Climate Control Module (CCM) 134 comprising one or more controllers 136. The controllers comprise as is known one or more processors 138, one or more memory modules 140 comprising any suitable memory including without intending any limitation SRAM, DRAM, EEPROM, NOR and ILC NAND flash memory, and others, and storage 142. The CCM 134 may comprise a single microprocessor or a plurality of microprocessors linked serially or otherwise.

The CCM 134 further comprises logic, i.e. computer-executable instructions stored in memory, for controlling the climate control system 104 and potentially other vehicle 100 systems. The CCM 134 is in informational communication with the sensor array 122 and in operational communication with elements of the climate control system 104. This will be described in greater detail below. Manual control of the climate control system 104 is also provided by way of at least one control panel 144 which may be configured in any of a number of known designs and technologies, typically disposed at least in a dash panel 146 of the vehicle 100 (see FIG. 2). Of course, other climate control system control panels may be provided for convenience of other users, for example associated with doors or consoles (not shown) disposed adjacent to one or more passenger seats of the vehicle 100.

With the foregoing as background, the present disclosure provides methods and systems for automatically controlling a defrost mode or function of the climate control system 104 by way of the CCM 134 according to various inputs received from the sensor array 122. At a high level, the method comprises, by the CCM 134, receiving at least an ambient temperature value input, an ambient relative humidity value input, and a window exterior surface temperature value input from the sensor array 122. From this information the CCM 134 is configured to determine whether to activate a defrost function of the climate control system 104, whether to activate the wiper system 118, and further to determine an optimal airflow temperature, blower 108 speed, and wiper system 118 speed for most rapid clearing of condensation/frost from the window 116 exterior surface.

Figure 3:
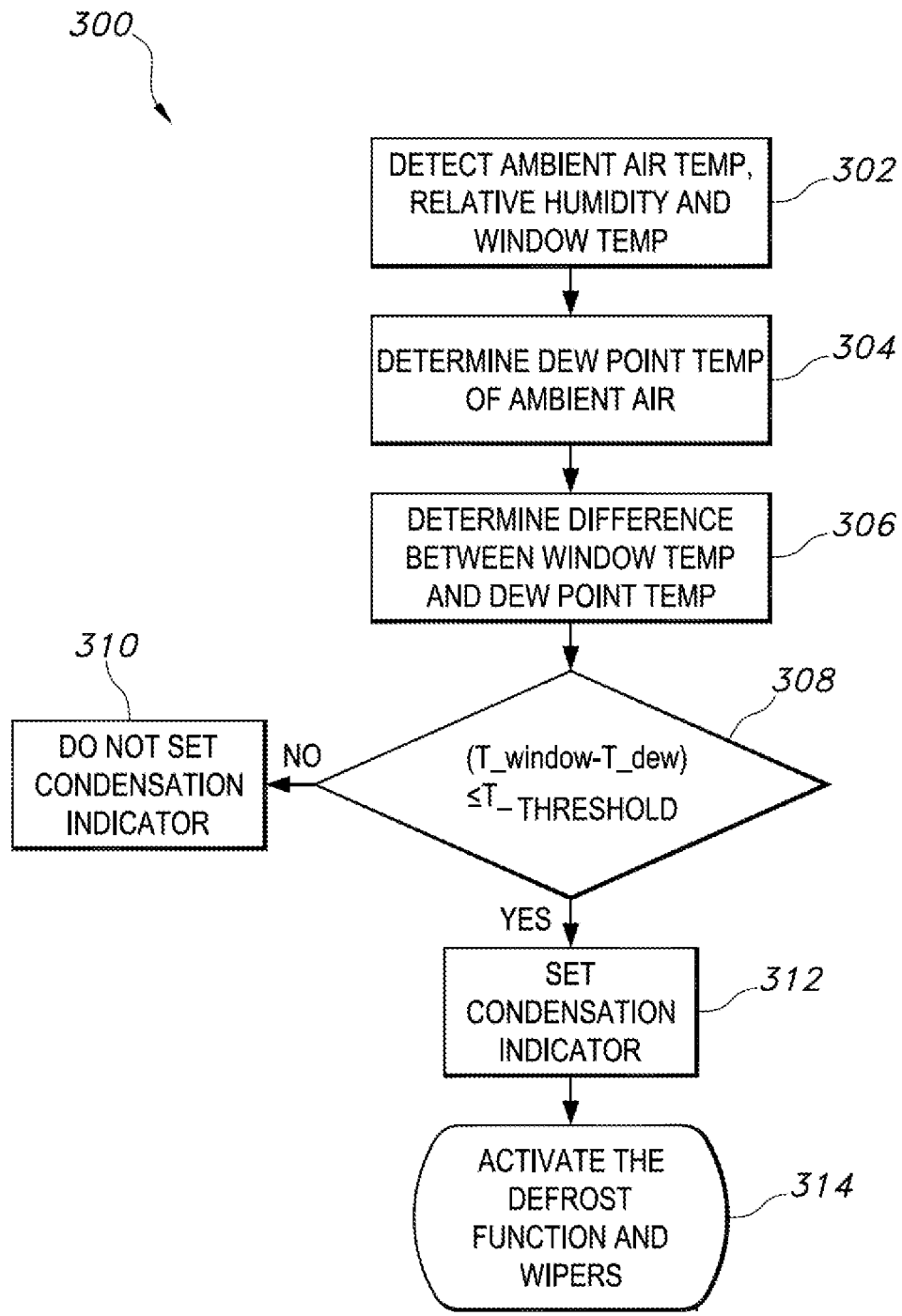
FIG. 3 illustrates in flow chart form a method for automatically controlling a climate control system defrost function according to the present disclosure.
Figure 4:
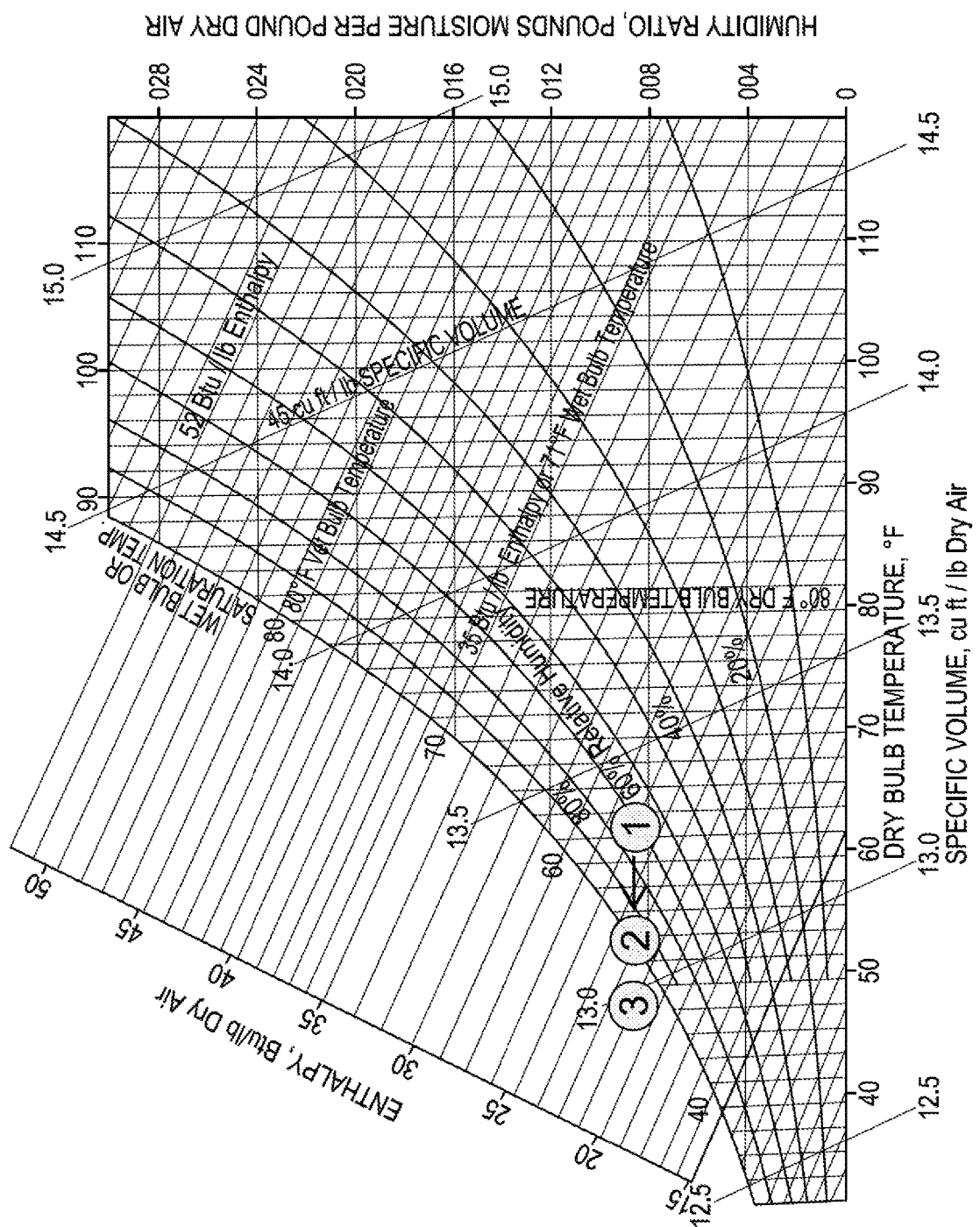
FIG. 4 illustrates in graphical form calculation of a dew point temperature value.

In more detail, with reference to FIG. 3 there is illustrated a method 300 for automatically controlling a defrost function of the climate control system 104. As is known and as is shown in graphical form in FIG. 4, condensation forms on an external surface of a vehicle window 116 by a psychrometric process when warm, moist air contacts a cooler surface, and so condensation forms only when the window 116 external temperature is less than an ambient air dew point temperature. Point 1 of FIG. 4 represents a selected ambient air temperature and ambient relative humidity. Condensation occurs when the window 118 external surface temperature (point 3) decreases below a dew point temperature of ambient air (see point 2). Dew point temperature is the temperature at which condensation occurs when moist air is cooled at a constant pressure, i.e. the saturation temperature associated with a partial pressure of water vapor.

Returning to FIG. 3, at step 302 the CCM 134 receives inputs from the ambient temperature sensor 124, the ambient relative humidity sensor 126, and the window temperature sensor 132. At step 304, the CCM 134 calculates a value for a dew point temperature as described above. Various methods for calculating dew point temperature are known in the art, which typically calculate dew point temperature as a function of actual ("dry bulb") ambient air temperature and relative humidity. Implementation of any of them is contemplated. In an embodiment, the CCM 134 calculates an ambient air dew point temperature and other variables associated with method 300 using a look-up table derived from the graph of FIG. 4. A representative look-up table is presented in Table 1 below. The inputs of window temperature, ambient air temperature, and ambient relative humidity are provided by sensors of the sensor array 122 as described above.

TABLE 1

Dew point temperature look-up table.

| Window temp. (° F.) | Ambient air temp. (° F.) | Ambient air relative humidity (%) | Ambient air dew point temperature (° F.) | Condensation indicator $T_{window} - (T_{dew\ point}) \leq T_{threshold}$ |
|---|---|---|---|---|
| 50 | 75 | 40 | 49 | Yes |
| 50 | 72 | 40 | 46 | Yes |
| 50 | 55 | 40 | 31 | No |
| 50 | 75 | 90 | 72 | Yes |
| 50 | 60 | 90 | 67 | Yes |
| 82 | 87 | 80 | 80 | Yes |

Next, at step 306 the CCM 134 calculates a subtractive difference between the determined window exterior surface temperature value and the calculated dew point temperature value (see also Table 1, final column). At step 308, the CCM 134 compares the calculated subtractive difference to a predetermined threshold value. If the calculated subtractive difference is greater than or equal to the predetermined threshold value, the CCM 134 takes no action (step 310). If the calculated subtractive difference is less than the predetermined threshold value, at step 312 the CCM 134 sets a condensation indicator. The predetermined threshold value may be calculated by the CCM 134 as a function of ambient relative humidity and temperature distribution across the window 116 exterior surface or may be preset as a default value by the vehicle 100 manufacturer according to environmental testing results.

On setting the condensation indicator, at step 314 the CCM 134 actuates the wiper system 118 to clear condensation/frost and/or actuates the climate control system 104 defrost mode to direct conditioned air against the interior surface 114 of the vehicle window 116 to further speed clearing of condensation/frost from the vehicle window exterior surface. In an embodiment, the CCM 134 first actuates the wiper system 118 as the most energy efficient and effective method of clearing condensation/frost, and next actuates the climate control system 104 defrost mode In an embodiment, the CCM 134 actuates the climate control system 104 to provide an optimal conditioned airflow, that is, an optimal airflow temperature, humidity, and blower speed to expedite clearing of condensation/frost. Methods for providing conditioned air at a predetermined airflow temperature, relative humidity, and speed are known in the art, and implementation of any known methods by the CCM 134 is contemplated. The specific temperature and humidity of the conditioned air directed against the interior surface 114 of window 116 may be determined as a function of passenger cabin 102 temperature and relative humidity, respectively provided to the CCM 134 as inputs from the passenger cabin temperature sensor 128 and passenger cabin relative humidity sensor 130.

In one possible alternative embodiment, as described above the CCM 134 is configured to determine a window exterior surface temperature and to calculate a dew point temperature value. The CCM 134 is further configured to compare the determined window exterior surface temperature and calculated dew point temperature value. The specific temperature and humidity of the conditioned air directed against the interior surface 114 of window 116 will be determined by the proximity of the determined window exterior surface temperature to the calculated dew point temperature value, i.e., as the window exterior surface temperature approaches the calculated dew point temperature value and the probability/likelihood of formation of condensation/frost increases, the CCM 134 will actuate the climate control system 104 to increase the temperature and decrease the humidity of the conditioned airflow by methods known in the HVAC arts.

In another embodiment, the CCM 134 actuates the wiper system 118 at an optimal wiper blade 120 speed to expedite clearing of condensation/frost. As will be appreciated, this occurs by placing the CCM 134 in operative control of the wiper system 118 motor. In one possible implementation of the embodiment, as is known a wiper system 118 motor may be adapted to move the wiper blades 120 in an intermittent mode, a low speed mode, and a high speed mode. In this embodiment, as described above the CCM 134 is configured to determine a window exterior surface temperature and to calculate a dew point temperature value. The CCM 134 is further configured to compare the determined window exterior surface temperature and calculated dew point temperature value. The selection of the wiper system 118 motor speed will be determined by the proximity of the determined window exterior surface temperature to the calculated dew point temperature value, i.e., as the window exterior surface temperature approaches the calculated dew point temperature value, the CCM 134 will increase the wiper blade 120 speed.

In yet another embodiment, a remote start or "preconditioning" function is provided by placing the CCM 134 in operative communication with a remote device 148 (see FIG. 1) which can be used to remotely actuate the climate control system 104 defrost function substantially as described above from a location exterior to the vehicle 100. The remote device 148 may be any suitable device known in the art for remote control of vehicular functions including without intending any limitation a key fob, a smartkey, a smartphone equipped with a suitably configured app similar to phone-as-a-key functionality, a desktop computing device, a mobile computing device such as a laptop or tablet, and others. The remote device 148 may be configured to communicate with the CCM 134 by any suitable wireless technology, including without intending any limitation Bluetooth®, RFID, and others.

Thus, by the foregoing description a simple, efficient, and robust system and method for controlling a climate control system 104 defrost function for optimal clearing of condensation/frost from a vehicle window 116. The foregoing disclosure has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A system for automatic control of a vehicle climate control system defog/defrost function, comprising a controller configured to:
   calculate an ambient dew point temperature value from a plurality of inputs received from a sensor array;
   set a condensation indicator if a calculated difference value between a window exterior surface temperature value input received from the sensor array and the calculated ambient dew point temperature value is less than or equal to a predetermined threshold temperature difference value; and
   actuate the vehicle climate control system defog/defrost function and/or a window wiper system in response to the set condensation indicator wherein (a) the sensor array comprises at least: one or more ambient temperature sensors, one or more ambient relative humidity sensors, one or more window exterior surface temperature sensors, one or more passenger cabin temperature sensors and one or more passenger cabin humidity sensors, (b) the controller is further configured to set a defrost airflow temperature value according to a proximity of the window exterior surface temperature value input to the calculated ambient dew point temperature value and (c) the controller is further configured to set a speed value of the window wiper system according to the proximity of the window exterior surface temperature value input to the calculated ambient dew point temperature value.

2. The system of claim 1, wherein the controller is comprised in a climate control module.

3. The system of claim 1, wherein the controller is further configured to calculate a subtractive difference between the window exterior surface temperature value input and the calculated ambient dew point temperature value to provide the calculated difference value.

4. The system of claim 3, wherein the controller is further configured to compare the calculated difference value to the predetermined threshold temperature difference value.

5. The system of claim 1, wherein the controller is further configured for operative communication with a remotely located device selected from the group consisting of a smartkey, a keyfob, a smartphone and a portable computing device.

6. A vehicle including the system of claim 1.

7. A method for automatic control of a vehicle climate control system defog/defrost function, comprising:
   by a controller, calculating an ambient dew point temperature value from a plurality of inputs received from a sensor array;
   by the controller, setting a condensation indicator if a calculated difference between a window exterior surface temperature value input received from the sensor array and the calculated ambient dew point temperature value is less than or equal to a predetermined threshold temperature difference value;

by the controller, actuating the vehicle climate control system defog/defrost function and/or a window wiper system in response to the set condensation indicator; and configuring the controller to set a speed value of the window wiper system according to the proximity of the window exterior surface temperature value input to the calculated ambient dew point temperature value.

8. The method of claim 7, including providing the sensor array comprising at least:

one or more ambient temperature sensors, one or more ambient relative humidity sensors, one or more window exterior surface temperature sensors, one or more passenger cabin temperature sensors and one or more passenger cabin humidity sensors.

9. The method of claim 7, including further configuring the controller to set a defrost airflow temperature value according to a proximity of the window exterior surface temperature value input to the calculated ambient dew point temperature value.

10. The method of claim 7, including providing the controller comprised in a climate control module.

11. The method of claim 7, including further configuring the controller to calculate a subtractive difference between the window exterior temperature value input and the calculated ambient dew point temperature value to provide the calculated difference value.

12. The method of claim 11, including further configuring the controller to compare the calculated difference value to the predetermined threshold temperature difference value.

13. The method of claim 7, including further configuring the controller for operative communication with a remotely located device selected from the group consisting of a smartkey, a keyfob, a smartphone and a portable computing device.

* * * * *